June 2, 1964  G. L. FAIRS ETAL  3,135,592
TREATMENT OF GASES WITH A LIQUID-WASHED FILTER
Filed Feb. 16, 1959
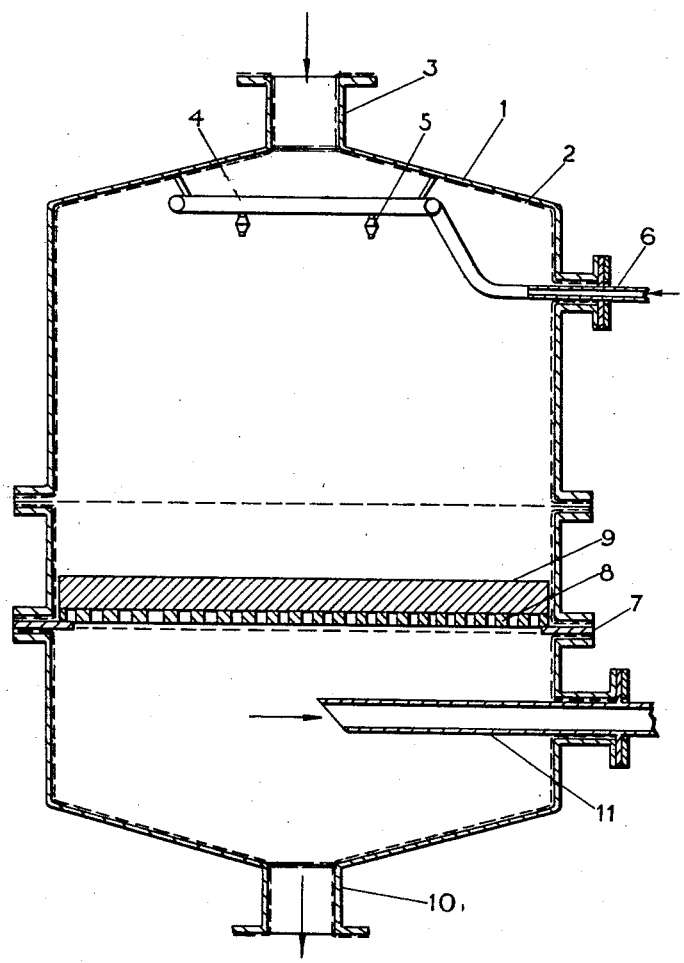
INVENTORS
GEOFFREY LOWRIE FAIRS
WALTER PLAUT
BY Cushman, Darby & Cushman
ATTORNEYS

3,135,592
TREATMENT OF GASES WITH A LIQUID-WASHED FILTER
Geoffrey Lowrie Fairs and Walter Plaut, Widnes, England, assignors to Imperial Chemical Industries Limited, Millbank, London, England, a corporation of Great Britain
Filed Feb. 16, 1959, Ser. No. 793,518
Claims priority, application Great Britain Feb. 25, 1958
6 Claims. (Cl. 55—90)

This invention relates to improved fibre filters for removing fine particles from gases or vapours and to a method for removing such fine particles when using such fibre filters. The invention is an improvement in or modification of the invention disclosed in copending invention disclosed in abandoned U.S. applications Serial Nos. 699,039, filed May 2, 1957, and 774,102, filed November 17, 1958, and U.S. Patent No. 3,107,986.

In those applications it is disclosed that detailed microscopical examination shows that when a gas or vapour containing a fine mist is passed through a fibre filter made from any of the materials hitherto used for that purpose, for instance, slag wool, cotton wool or glass wool, the diameters of the constituent fibres being so chosen in relation to the size of the mist droplets that they can be expected to trap the mist, then such droplets as are trapped wet the fibres and form a film of liquid thereon. This film is not of uniform thickness—indeed at first inspection it may appear that discrete droplets are held on the fibres, but closer examination shows that the droplets are not separate and independent but that a film of liquid, substantially continuous, surrounds the fibre and extends from one droplet to the next.

In contrast it was found that with another class of fibres conveniently called "non-wettable" fibres an outstanding and most surprising increase in filtration efficiency is obtained. These are fibres whereon the mist is deposited in separate and independent droplets not connected (as is the case with the "wettable" fibres hitherto used) by a bridging film of liquid. Such dropwise deposition of mist does not occur with the "wettable" fibres previously mentioned.

It was further explained that the problem of making a suitable fibre filter is not, as might be imagined, simply a matter of utilising a hydrophobic or water-repellant fibre. It was found, for instance, that silicone-treated glass wool and "Terylene" polyester fibre ("Terylene" is a registered trademark) form outstandingly effective fibre filters whereas such materials as untreated glass wool, nylon staple fibre, polyvinyl chloride fibre and slag wool, are not effective as filters for fine mists. Thus, although polyvinyl chloride fibre is the most water-repellant (as measured by the mean contact angles between the fibres and 10% sulphuric acid) of all the fibres mentioned it is not highly efficient as a filter medium.

Accordingly an improved process was claimed in U.S. application Serial No. 699,039, filed May 2, 1957, of removing mists of particle size less than $5\mu$ from gases or vapours which comprises passing the mist-containing gas or vapour through a fibre filter composed of "non-wettable" fibres of varying diameter, mostly in the range $5\mu$ to $50\mu$, a "non-wettable" fibre being defined as one whereon the mist is deposited not in the form of a continuous film but substantially completely in the form of discrete droplets held on the surface of, but not surrounding, the fibres, the spaces between the droplets being substantially free from film-like deposits. It was further disclosed that such filters may be obtained by packing the fibres to the required packing density and holding the packed fibres between confining metal gauzes.

However, in U.S. application Serial No. 774,102, filed November 17, 1958, it is disclosed that such filters have some drawbacks and that these may be avoided by utilising a fibre that is in some degree thermoplastic, preforming the filter in a mould in which the requisite compression is applied, heating the filter so as to relieve the stresses and then removing the stabilised and now self-supporting filter from the mould. Any desired surface treatment, such as for instance, the application of a silicone to a glass filter may be applied after the stress relieving operation is completed.

We have now found that fibre filters composed of "non-wettable" fibres as are described in U.S. application Serial No. 699,039, filed May 2, 1957, and U.S. application Serial No. 774,102, filed November 17, 1958, are improved if they are irrigated with a liquid.

According to one aspect of the invention, therefore, there are provided irrigated fibre filters for the removal of fine particles from gases or vapours wherein the fibre filter is composed of "non-wettable" fibres of various diameters mostly in the range $5\mu$ to $50\mu$, a "non-wettable" fibre being defined for the purpose of the description which follows as well as the claims, as one whereon mist from a mist-containing gas or vapour would be deposited not in the form of a continuous film but substantially completely in the form of discrete droplets held on the surface of, but not surrounding, the fibres, the spaces between the droplets being substantially free from film-like deposits. The term "non-wettable" as used in the claims only refers to fibers within the above definition.

According to a further aspect of the invention there is provided an improved process of removing fine particles from gases or vapours which comprises passing the gas or vapour containing the fine particles through an irrigated fibre filter, the filter being composed of "non-wettable" fibres as above described.

Preferably preformed filters are employed of the kind formed by compressing the fibres in a mould to give a body of desired shape and then, while under compression, heating them so as to relieve the stresses in the fibres. Such preformed fibre filters are as aforesaid described and claimed in U.S. application Serial No. 774,102.

For the purpose of the present specification and claims the liquid irrigating the filter is to be interpreted as one which is capable of physically dissolving, emulsifying, dispersing, or forming a fine suspension, for instance, a colloidal suspension with the said particles or which reacts chemically with the said particles whereby they become dissolved emulsified or dispersed. The liquid can then contain an emulsifying or dispersing agent or an agent which forms a colloidal suspension of the particles.

The irrigated filters of the present inventiton are useful for removing liquid particles. Now the fibre filters of applications Serial Nos. 699,039 and 774,102 aforesaid while extremely useful in removing fine mists do in some circumstances have the drawback that a particular fibre filter may be liable to attack by a strongly corrosive mist-containing gas or vapour. Thus a fibre filter composed of glass fibres having and adherent silicone surface would in the course of time be attacked by a gas containing a large amount of concentrated sulphuric acid particles. This must constitute some limitation on the choice and use of the filters described in the aforesaid copending applications. By way of contrast the present irrigated fibre filters are not so limited since with continuous irrigation of the filters they are less liable to attack for the offending particles are diluted in the liquid in the body of the filter.

Again, the present invention is of particular use in removing solid particles such as, for example, sodium monoxide fume. Thus when diaphragms are being replaced in cells for the electrolysis of fused mixtures of sodium chloride and calcium chloride for the manufacture of sodium and chlorine a fume is obtained containing fine particles of sodium monoxide together with a little calcium chloride and sodium chloride and a little chlorine. Again a fume containing fine particles consisting almost entirely of sodium oxide is obtained when sodium residues are being disposed of in burner bays. Such fumes are very objectionable and numerous attempts have been made to try to remove such fume effectively. Thus the fume has been passed through a filter composed of slag wool fibres but it was found that such a filter quickly blocked with collected solids. This filter was also attacked by small quantities of chlorine which were present in the fume. Again a fibre filter composed of very fine untreated glass fibres ("wettable" fibres) will not effectively remove fumes of sodium and potassium oxide particles entrained in air since high pressure drops are required and in any case the filter soon blocks. Moreover such filters cannot be irrigated with a liquid such as water to remove deposited solids as it very quickly logs and becomes useless as a filter medium. However, when using a "non-wettable" fibre filter, suitably one composed of "Terylene" polyester fibres or one composed of glass fibres having an adherent silicone surface, which is continuously irrigated with water it was found that these filters were completely effective in removing sodium monoxide fumes. Moreover when using such filters the process of removing the particles may be operated at relatively low pressure drops. While the filters of the present invention can be used to remove extremely fine liquid and solid particles of extremely fine particle size, for instance of size less than $5\mu$, they may also be used for the removal of particles of considerably greater size, for instance $25\mu$ or more.

The fibre filters of the present invention must be composed of "non-wettable" fibres and examples of the various types of irrigated filters which may be employed according to the present invention are fibre filters composed of glass fibres having an adherent silicone surface and filters composed of polyethylene terephthalate fibres such as are sold under the registered trademark "Terylene"; another useful "non-wettable" fibre is polyacrylonitrile fibre.

The fibre filters are normally packed to a density of the order of 80 to 160 kg./m.$^3$, suitably about 96 kg./m.$^3$. When operating the process of removing fine particles from a gas or vapour with such filters the pressure drops are in the range 7.5 to 62.5 cms. water gauge. Good results may however be obtained with pressure drops in the range 7.5 to 37.5 cms. water gauge or even less, for instance, in the range 7.5 to 25 cms. water gauge.

In the case of fibre filters having an adherent silicone surface the silicones which are applied to the glass fibre surface may be generally described as organo-silicon compounds containing polysiloxane linkages. These may suitably be applied to the glass fibres in the form of silicone fluids and silicone resins. The term "silicone fluid" or as it is sometimes called "silicone oil" is to be understood as applying to liquid products which may be obtained by hydrolysis and condensation of an intermediate material consisting essentially of dialkyl dichlorosilanes. Silicone fluids may also be obtained in which alkyl groups are replaced by aryl and alkenyl groups. Silicone resins are normally prepared by hydrolysis of mixtures of dialkyl and/or diaryl dichlorosilanes and trialkylchlorosilanes. Silicone resins may also be obtained from alkyl dichlorosilanes. Although the word resin suggests a solid or semi-solid nature, silicone resins can indeed be liquid products which only become solid if they are caused to undergo further condensation by heating.

One particular silicone fluid which is useful for providing an adherent surface on glass fibres consists of a product which is obtained by partial hydrolysis and condensation of a methylchlorosilane mixture consisting essentially of dimethyldichlorosilane, which product still contains in addition to its polysiloxane groups from 16% to 27% silicon-bound chlorine. This means that the terminal groups of the polymer still contain unhydrolysed methylchlorosilane residues. Such a material is available commercially and may be obtained under the trade name Silicone Fluid M.441 from Imperial Chemical Industries Limited. To provide an adherent surface on the said glass fibres with this silicone the fibres are immersed in a 2% solution of the silicone in trichloroethylene, allowed to drain and finally dried at 110° C.

One suitable form of apparatus for removing fine particles according to the invention is illustrated in the drawing accompanying the provisional specification. In the drawing 1 is a mild steel vessel having a rubber lining 2 with an inlet pipe 3 for the contaminated gas or vapour. 4 is a lead pipe in the form of a ring. Fitted symmetrically about and into the lead pipe 4 are four sprays 5 of which, for clarity, only two are shown. 6 is the inlet end of the lead pipe 4 through which the irrigating liquid passes on its way through the four sprays. 7 is a plastic ring carrying the plastic grid supports 8 for the preformed filter mat 9. 10 is a luted drain for the liquid after passing through the filter and 11 is a plastic pipe through which passes the gas freed from contaminating particles. In this apparatus the contaminated gas passes downwardly cocurrently with the spray. Alternative arrangements can also be made; for instance one can have a vertical filter system and pass the gas downwardly through the filter system while at the same time irrigating in a horizontal manner the upstream face.

The following examples illustrate the invention.

*Example 1*

In a plant for the manufacture of sulphuric acid the gases leaving the contact chamber were first cooled, then absorbed in a strong sulphuric acid and subsequently passed through alkali-containing absorption towers. The sulphuric acid content of the mist-containing exit gas varied between 0.05 and 0.1 gram $H_2SO_4$ per cubic metre of gas and the mist particles were all of size less than $2\mu$; 10% of them by weight being less than $1\mu$. Glass fibres of diameters in the range $5\mu$ to $40\mu$ were packed and compressed in a mould to a density of 96 kg./m.$^3$ to form a layer 5 cms. deep. The glass fibres were then heated while under compression for one hour at 500° C. The heat stabilised mat was then removed, washed in trichloroethylene and subsequently immersed in a 2% solution of Silicone Fluid M.441 in trichloroethylene, allowed to drain and dried at 110° C. The surface area of the filter presented to the contaminated gas stream was approximately 0.93 sq. m.

The apparatus used was that described in the drawing. The mist-containing exit gas was passed downwardly through the filter at a rate of 280 m.$^3$/hr. sq. metre of filter surface and the pressure drop was 11 cms. water gauge. The filter was continuously irrigated with water, the irrigation rate being approximately 5.4 l./hr. sq. metre of the filter area. While the filter was in continuous operation for over 1000 hours there was no visible fume in the exit gas. The sulphuric acid content of the exit gas varied between 0.0005 gram and 0.001 gram $H_2SO_4/m.^3$.

In the following examples a form of apparatus was used convenient for carrying out the small scale trials described. This apparatus consisted essentially of a glass vessel containing a tray on which was situated a preformed filter, which filter was irrigated by means of a liquid introduced through a pipe equipped with a single nozzle.

*Example 2*

Glass fibres of diameter in the range $5\mu$ to $40\mu$ were packed and compressed in a mould to a density of 160 kg./m.³ to form a layer 5 cms. deep. The glass fibres were then heat treated and provided with an adherent silicone surface as described in Example 1. The filter was in the form of a flat cylindrical mat 37.5 cms. in diameter.

From a burner bay disposing of sodium residues air was withdrawn containing sodium oxide particles having a top particle size of about $9\mu$, 50% by weight being less than $5\mu$. The concentration of the particles varied between 0.25 and 0.8 g./m.³ of air. This air was passed through the filter which was continuously irrigated with water, the irrigation rate being of the order of 5.4 l./hr. sq. metre of the filter area. The throughput of air passing through the irrigated filter varied between 280 m.³/hr. sq. metre of the filter area at 40 cms. water gauge pressure drop and 205 m.³/hr. sq. metre of filter area at 35 cms. water gauge pressure drop. Water containing dissolved sodium hydroxide was removed at a point in the apparatus below the filter.

At no time during a run of 700 hours was any fume visible in the exit gases after passing through the filter and any solids present in the exit gas were in quantities which were certainly less than 0.001 g./m.³.

*Example 3*

"Terylene" polyester fibres ("Terylene" is a registered trademark) of fibre diameters in the range $10\mu$ to $40\mu$ were pre-shrunk by heating the fibres without compression at 200° C. for 1 hour. The pre-shrunk fibres were then packed and compressed to a density of 160 kg./m.³ to form a layer 5 cms. deep. The fibres were then heated while under compression for an hour at 200° C. The filter was in the form of a flat cylindrical mat 37.5 cms. in diameter.

The procedure of Example 2 was repeated using this fibre filter with water as the irrigating liquid.

With a throughput of 231 m.³/hr. sq. metre of filter surface the water gauge pressure drop was 37.5 cms. At no time during a run of 900 hours was any fume visible in the exit gas leaving the filter, any solids present in the exit gas being in quantities less than 0.001 g./m.³.

*Example 4*

Glass fibres of particle size $5\mu$ to $40\mu$ were packed and compressed in a mould to a density of 96 kg./m.³ to form a layer 5 cms. deep. The glass fibres were then heated while under compression for one hour at 550° C. The glass fibres were then provided with an adherent silicone surface as described in Example 1. The filter was in the form of a flat cylindrical mat 37.5 cms. in diameter.

From a burner bay disposing of sodium residues air was withdrawn containing sodium oxide particles as described in Example 2, the concentration of the particles varying between 0.25 and 1 g./m.³ of air. This air was passed through the filter which was continuously irrigated with water, the irrigation rate being of the order of 24.4 to 48.8 l./hr. sq. metre of the filter area. The throughput of air passing through the irrigated filter was about 237 m.³/hr. sq. metre of the filter area at a water gauge pressure drop of 17.5 to 25 cms. Water containing dissolved sodium hydroxide was removed at a point in the apparatus below the filter.

The filter was in operation for 3 months during which time no detectable amount of solid was found in the exit gases, any solids present in the exit gas being less than 0.001 g./m.³.

*Example 5*

"Terylene" polyester fibres ("Terylene" is a registered trademark) of fibre diameters in the range $10\mu$ to $40\mu$ were pre-shrunk by heating the fibres without compression at 160° C. The pre-shrunk fibres were packed and compressed to a density of 96 kg./m.³ to form a layer 5 cms. deep. The fibres were then heated while under compression for 1 hour at 140° C. The filter was in the form of a flat cylindrical mat 37.5 cms. in diameter.

In the replacement of diaphragms in cells for the electrolysis of fused mixtures of sodium chloride and calcium chloride there was obtained a fume containing fine particles of sodium monoxide together with a little calcium chloride and sodium chloride and a little chlorine. The top particle size of the contaminating particles was less than $4\frac{1}{2}\mu$, 90% by weight being less than $3\frac{1}{2}\mu$ and 50% by weight being less than $2\mu$. The concentration of the particles varied between 0.25 and 1 g./m.³ of air.

The filter was operated to remove this fume for a period of 2 months under the conditions described in Example 4 and during this time no detectable amount of solid was found in the exit gas, any solid present in the exit gas being present in quantities less than 0.001 g./m.³.

What we claim is:

1. A liquid washed filter for the removal of fine particles from gases and vapors comprising a fiber filter wherein the filter is composed of a non-woven mass of separate and individual "non-wettable" fibers having diameters essentially in the range $5\mu$ to $50\mu$, a "-non-wettable" fiber being defined as one whereon the fine particles can be deposited substantially completely in the form of discrete droplets held on the surface, of, but not surrounding the fibers, the spaces between the droplets being substantially free from film-like deposits; means for flowing gases and vapors carrying the fine particles through the filter; and means for continuously washing the fine particles from the filter with a liquid as gases and vapors pass therethrough.

2. A process of removing fine particles from gases and vapors which comprises passing said gases and vapors through a fiber filter composed of a non-woven mass of separate and individual "non-wettable" fibers having diameters essentially in the range $5\mu$ to $50\mu$, a "non-wettable" fiber being defined as one whereon the fine particles can be deposited substantially completely in the form of discrete droplets held on the surface of, but not surrounding the fibers, the spaces between the droplets being substantially free from film-like deposits; and continuously irrigating the fine particles from the filter with liquid while gases and vapors pass therethrough.

3. A liquid washed fiber filter as set forth in claim 1 wherein the fiber filter is a preformed filter composed of a non-woven mass of separate and individual fibers of the kind obtained by compressing the fibers in a mold to give a body of desired shape and then, while under compression, heating them so as to relieve the stresses in the fibers.

4. A liquid washed fiber filter according to claim 1 in which the filter is composed of a non-woven mass of separate and individual glass fibers provided with an adherent surface layer of an organo-silicon compound containing polysiloxane linkages.

5. A liquid washed fiber filter according to claim 4 in which said organo-silicon compound is the partial hydrolysis and condensation product of a methylchlorosilane mixture consisting essentially of dimethyl-dichlorosilane, said product containing, in addition to its polysiloxane groups, from 16% to 27% silicon-bound chlorine.

6. A liquid washed fiber filter as set forth in claim 1 wherein the filter is composed of a non-woven mass of separate and individual polyethylene terephthalate fibers.

References Cited in the file of this patent
UNITED STATES PATENTS

| | | |
|---|---|---|
| 1,577,703 | Fedeler | Mar. 23, 1926 |
| 1,841,536 | Jordahl | Jan. 19, 1932 |
| 1,988,262 | Burckhalter et al. | Jan. 15, 1935 |
| 2,121,278 | Babcock | June 21, 1938 |
| 2,137,905 | Church et al. | Nov. 22, 1938 |
| 2,355,822 | Rugeley | Aug. 15, 1944 |
| 2,357,392 | Francis | Sept. 5, 1944 |
| 2,384,424 | Rodgers et al. | Sept. 4, 1945 |
| 2,392,805 | Biefeld | Jan. 15, 1946 |
| 2,541,838 | Shardlow | Feb. 13, 1951 |
| 2,774,443 | Slayter | Dec. 18, 1956 |
| 2,784,132 | Maisel | Mar. 5, 1957 |
| 2,812,038 | Krueger | Nov. 5, 1957 |
| 2,839,158 | Reinauer | June 17, 1958 |

FOREIGN PATENTS

| | | |
|---|---|---|
| 578,156 | Great Britain | June 18, 1946 |